Feb. 16, 1965 L. A. HOHMANN, JR 3,170,043
TELEPHONE ANTI-SIDETONE CIRCUIT
Filed Sept. 29, 1961
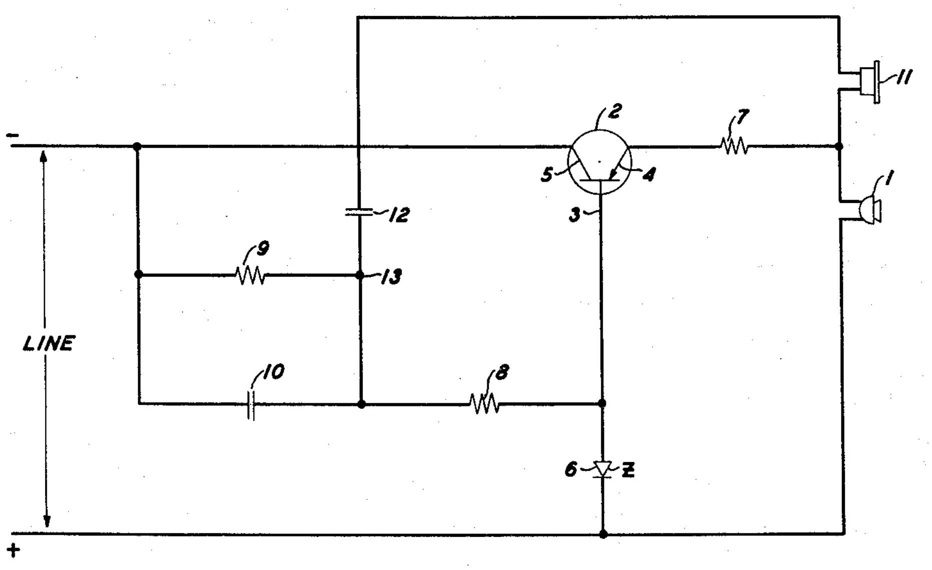
INVENTOR
L. A. HOHMANN, JR.
BY V. P. Prisko
ATTORNEY United States Patent Office 3,170,043

Patented Feb. 16, 1965

3,170,043

TELEPHONE ANTI-SIDETONE CIRCUIT

Lawrence A. Hohmann, Jr., Chatham, N.J., assignor to Bell Telephone Laboratories, Incorporated, New York, N.Y., a corporation of New York Filed Sept. 29, 1961, Ser. No. 141,775
11 Claims. (Cl. 179—81)

This invention relates to hybrid arrangements, and more particularly, to sidetone balancing circuits of the type useful in subscriber telephone sets.

Two-wire subscriber telephone circuits are almost universally arranged in hybrid type configurations wherein the transmitter and receiver units are mutually conjugant, that is to say, signals generated in either transmitter or receiver are subsantially, but not entirely, muted in the other. Most commonly, such arrangements include first and second similarly poled coils in series with one conductor of the line, and a third coil, inductively coupled with the first two, which transfers incoming speech signals to the set's receiver. The set's transmitter is bridged between the junction of the first and second coils and the other conductor of the line. The line is generally terminated in the set by a self-balancing impedance network including a current-sensitive variable impedance element, a varistor for example, which serves to equalize the strength of transmission over the line regardless of loop length. When a set is so arranged, speech energy generated by the transmitter divides between the first and second coils in proportion to the impedance match between the network and the line, one portion of the energy being applied to the line and the other portion being dissipated in the balancing network. Due to the relative polarities of the first and second coils, their inductive effects tend to cancel so as to produce very little energy in the third coil. To impart the desirable quality of naturalness to the set, the impedance match between the network and the line is adjusted so that a predetermined quantity speech energy is audibly discernible in the receiver.

From the standpoints of endurance, performance and simplicity, to mention only a few, hybrid arrangements of the type described above have been found superlative devices, which accounts in part for their predominance in present day subscriber telephone sets. However, in telephone sets where considerations of size and weight are material, for example, dial-in-hand type sets, such as disclosed in Design Patent 190,867 granted on July 11, 1961, to Mr. L. W. Mosing, the physical characteristics of a multiwinding hybrid coil and its associated cores present severe obstacles. This problem has been recognized in the prior art, and transistorized devices such as those disclosed in U.S. Patent 2,762,867 granted to Mr. L. A. Meacham on September 11, 1956, have been proposed as solutions. While arrangements such as those disclosed by Meacham do reduce the size and weight of telephone hybrid circuits by a considerable degree, they are not entirely satisfactory from a commercial aspect due to the cost involved in their requiring either a single balanced transistor or one or more pairs of ordinary three electrode transistors.

Accordingly, it is a principal object of this invention to reduce the size and weight of telephone hybrid circuits.

It is another object of the invention to diminish the cost of telephone hybrid arrangements which utilize semiconductor elements.

The objects of the invention are achieved, broadly, by means of a subscriber telephone circuit which includes an amplifier disposed intermediate a transmitting device and a telephone line, an impedance circuit bridged across the line, and a receiving device electrically bridged between the transmitting device and an intermediate point on the impedance circuit.

One feature of the invention resides in an arrangement for amplifying signals generated by the transmitter of a subscriber telephone set in which the output of the amplifier includes means for supplying a signal in like phase and magnitude with the unamplified signals.

Another feature of the invention resides in an arrangement wherein detecting means are provided at the output circuit of an amplifier to sense signals which are in like phase and magnitude with signals at the input circuit of the amplifier, and in which a receiver is bridged between the detecting means and the amplifier input circuit in such manner that amplified signals are substantially muted in the receiver.

Still another feature of the invention resides in a transistorized arrangement for rendering the speech current output level of a subscriber telephone circuit substantially independent of line voltage.

The foregoing and numerous other objects and features of the invention will be more thoroughly understood by reference to the following detailed description of an illustrative embodiment of the invention, in conjunction with the single drawing which depicts the invention embodied in a transistorized subscriber telephone circuit.

With reference to the drawing, a subscriber telephone circuit is shown as having a transmitting device 1, which may be a conventional carbon granule type microphone for example, coupled to a telephone line through an amplifying arrangement comprising a transistor 2 having base, emitter and collector electrodes 3, 4, and 5, respectively, and a constant voltage device depicted as Zener diode 6. As shown in the drawing, transmitting device 1 is a two terminal circuit which is coupled to the input of the amplifying arrangement by having one terminal connected to emitter 4 of transistor 2 via a resistor 7, and the other terminal connected to base 3 through Zener diode 6. The output circuit of the amplifying arrangement is bridged across the line, the upper conductor of the line being joined to collector 5 and the lower conductor being joined to the cathode of Zener diode 6. An impedance circuit comprising a resistor 8 serially connected at a junction 13 with the parallel combination of a resistor 9 and a capacitor 10 is bridged between collector 5 and base 3 of transistor 2. The circuit is completed by a receiver 11 in series with a blocking capacitor 12 being connected between the emitter side of transmitting device 1 and junction 13.

Bias energy for the amplifying arrangement originates from a telephone central office (not shown) which energizes the conductors of the line with a unidirectional potential of the polarity indicated. As shown, the polarity of the line potential is directed to place Zener diode 6 in its reverse conduction state in which it exhibits substantially constant voltage across its terminal. When breakdown potential is exceeded, diode 6 establishes a conduction path through which direct current emanating from the central office and applied to the lower conductor of the line flows through resistors 8 and 9 and is returned via the top conductor.

In operation, speech voltages generated by transmitting device 1 are coupled to emitter 4 through resistor 7, and appear amplified in magnitude, but identical in phase, at collector 5 for application to the line. According to the invention, an impedance circuit, shown in the drawing as capacitor 10 and resistors 8 and 9, is connected to the line at the output of the amplifying arrangement, and receiver 11, along with its associated blocking capacitor 12, is bridged between an intermediate point on the impedance circuit, namely junction 13, and transmitting device 1. If the elements of the impedance circuit are properly proportioned, the magnitude of voltages induced at junction 13 by the collector circuit of transistor 2 is substantially equal in magnitude to the voltage appearing at the emitter side of transmitting device 1. In addition, these signals are in like phase by virtue of the transistor 2 being arranged in the familiar common base configuration. Hence, substantially no sidetone is generated in receiver 11 since the circuit path in which it is included is bridged across equipotential points of the amplifying arrangement.

The embodiment of the invention illustrated in the drawing is particularly advantageous in that the gain of transmitting device 1, and consequently the gain of the telephone circuit as a whole, is substantially constant and relatively independent of line voltage. As is well known, the gain of an encapsulated carbon granule type microphone, such as is conventionally used in subscriber telephone sets and is depicted schematically in the drawing as transmitting device 1, is a direct function of the bias current applied to its terminals. In conventional hybrid arrangements, such as those of the variety first described, biasing current for the microphone is proportional to line voltage. Thus, depending upon the length of the line from the central office, microphone gain may vary considerably. The gain of the transmitting device of the present invention is rendered insensitive to variations in line voltage, provided that this voltage exceeds a predetermined minimum level, by virtue of device 1 being connected in the emitter circuit of transistor 2, which circuit is energized by the substantially constant voltage across Zener diode 6. So long as the line voltage exceeds the reverse breakdown potential of Zener diode 6, the current which biases transmitting device 1, and concomitantly the gain of device 1, remain constant. Since the gain of transmitting device 1 is constant, the output level of speech signals is substantially constant regardless of the set's location with respect to the central office.

Incoming speech energy on the line is applied across resistors 8 and 9, capacitor 10, and diode 6, and a portion of this energy is tapped at junction 13 for application to receiver 11 through capacitor 12. The collector circuit of transistor 2, constituting a very high impedance, does not unnecessarily load the line. Speech currents translated through receiver 11 split and are returned to the bottom conductor of the line through either transmitting device 1 or the emitter-to-base junction of transistor 2, in inverse proportion to the impedance ratio of these paths. As transmitting device 1 and receiver 11 are in conjugate relationship, voltages generated by received speech currents flowing through the former are fed back, in a positive sense, through transistor 2 to enhance signals applied to the latter. In this manner, power dissipated by the resistance of transmitting device 1 is compensated for, in part, by a more powerful signal being applied to receiver 11.

Although only a single embodiment of the invention has been described herein, it is to be understood that numerous other arrangements and embodiments may be conceived without departing from the spirit and scope of the invention.

What is claimed is:

1. A subscriber telephone circuit comprising transmitting means, amplifying means, and a telephone line, first and second circuit means respectively joining said amplifying means to said telephone line and said transmitting means so that said amplifying means are disposed intermediate said transmitting means and said line, impedance means consisting of parts effectively linked only by conduction, said impedance means having terminal points bridged across said line, and receiving means bridged between said second circuit means and a point situated on said impedance means intermediate said terminal points.

2. A subscriber telephone circuit comprising transmitting means, amplifying means, said amplifying means having an input circuit and an output circuit, and a telephone line, said transmitting means being connected to said input circuit and said line being connected to said output circuit, impedance means consisting of parts effectively linked only by conduction, said impedance means having terminal points connected in said output circuit, and receiving means bridged between said input circuit and a point situated on said impedance means intermediate said terminal points.

3. A subscriber telephone circuit comprising transmitting means for generating speech signals, amplifying means connected to amplify said speech signals, a transmission line, said amplifying means including first and second mutually distinct circuits respectively joined to said transmitting means and said transmission line, attenuating means, means for applying amplified speech signals both to said line and to said attenuating means, detecting means in said attentuating means for sensing an attenuated portion of said amplified speech signal, a receiver, and means for bridging said receiver between said first circuit means and said detecting means.

4. A subscriber telephone circuit comprising transmitting means for generating speech signals, a transistor amplifier connected to amplify said speech signals, a telephone line, said amplifier having mutually distinct first and second circuit means respectively joined to said transmitting means and said telephone line, attentuating means, means for applying amplified speech signals both to said line and to said attenuating means, detecting means in said attenuating means for sensing an attenuated portion of said amplified speech signal, a receiver and means for bridging said receiver between said first circuit means and said detecting means.

5. A subscriber telephone circuit comprising a transistor amplifier having an input circuit and an output circuit, network means in said input circuit distinct from said output circuit, a telephone transmitter having a pair of terminals connected to said input circuit, one of said terminals being connected to said network means, a telephone line connected to said output circuit, attenuating means connected to said output circuit, and a telephone receiver connected between said attenuating means and said network means.

6. A subscriber telephone circuit comprising a transistor amplifier having an input and an output circuit distinct from each other, a telephone transmitter connected in said input circuit, a telephone line connected to said output circuit, voltage, dividing means consisting of parts effectively linked only by conduction and connected to said output circuit, a telephone receiver, and means for connecting said receiver between said input circuit and an intermediate point on said voltage dividing means.

7. A telephone subscriber circuit comprising a transistor amplifier, said amplifier including a transistor having a base electrode, an emitter electrode, and a collector electrode, a telephone transmitter, first and second electrical means respectively connecting said transmitter to said base and emitter electrodes, a telephone line connected to said amplifier, voltage dividing means connected between said base and collector electrodes, a two terminal telephone receiver, and means for connecting the terminals of said receiver between said second electrical means and an intermediate point on said voltage dividing means.

8. A telephone subscriber circuit comprising a transistor, said transistor having a base electrode, an emitter electrode, and a collector electrode, a constant voltage device comprising first and second terminals, said first terminal being connected to said base electrode, a telephone transmitter connected between said emitter electrode and said second terminal, a telephone line connected between said collector electrode and said second terminal, a voltage divider connected between said collector electrode and said first terminal, and a telephone receiver connected between said emitter electrode and an intermediate point on said voltage divider.

9. A telephone subscriber circuit in accordance with claim 8 wherein said constant voltage device comprises a Zener diode.

10. A telephone subscriber circuit comprising a telephone transmitter for generating speech signals, an amplifier having an input and an output with mutually distinct input and output terminals whose alternating voltages are in phase with each other, circuit means connecting said transmitter to the input terminal of said amplifier, means in said amplifier for establishing substantially constant bias current in said transmitter, a telephone line connected to said output of said amplifier, voltage dividing means connected across said output, telephone receiver means connected between said transmitter and an intermediate point on said voltage divider.

11. A telephone subscriber circuit comprising a telephone transmitter for generating speech signals, a transistor amplifier connected to amplify said speech signals, said amplifier having a pair of output terminals, means included in said amplifier for supplying substantially constant bias current to said transmitter, a telephone line, said line being connected to said output terminal of said amplifier, voltage dividing means connected to said output terminals of said amplifier, telephone receiver means, and means for connecting said receiver means between said transmitter and an intermediate point on said voltage dividing means, said means for supplying substantially constant current to said transmitter comprising a Zener diode.

References Cited in the file of this patent

UNITED STATES PATENTS

| | | |
|---|---|---|
| 1,654,929 | Foley | Jan. 3, 1928 |
| 2,693,572 | Chase | Nov. 2, 1954 |
| 2,762,867 | Meacham | Sept. 11, 1956 |
| 2,818,470 | Busala et al. | Dec. 31, 1957 |
| 2,838,612 | Pocock | June 10, 1958 |
| 3,052,761 | Tsuchiya | Sept. 4, 1962 |